March 21, 1933. R. R. KNIGHT 1,902,248
PROCESS AND APPARATUS FOR PURIFICATION OF SEWAGE AND TRADE WASTES
Filed June 1, 1931
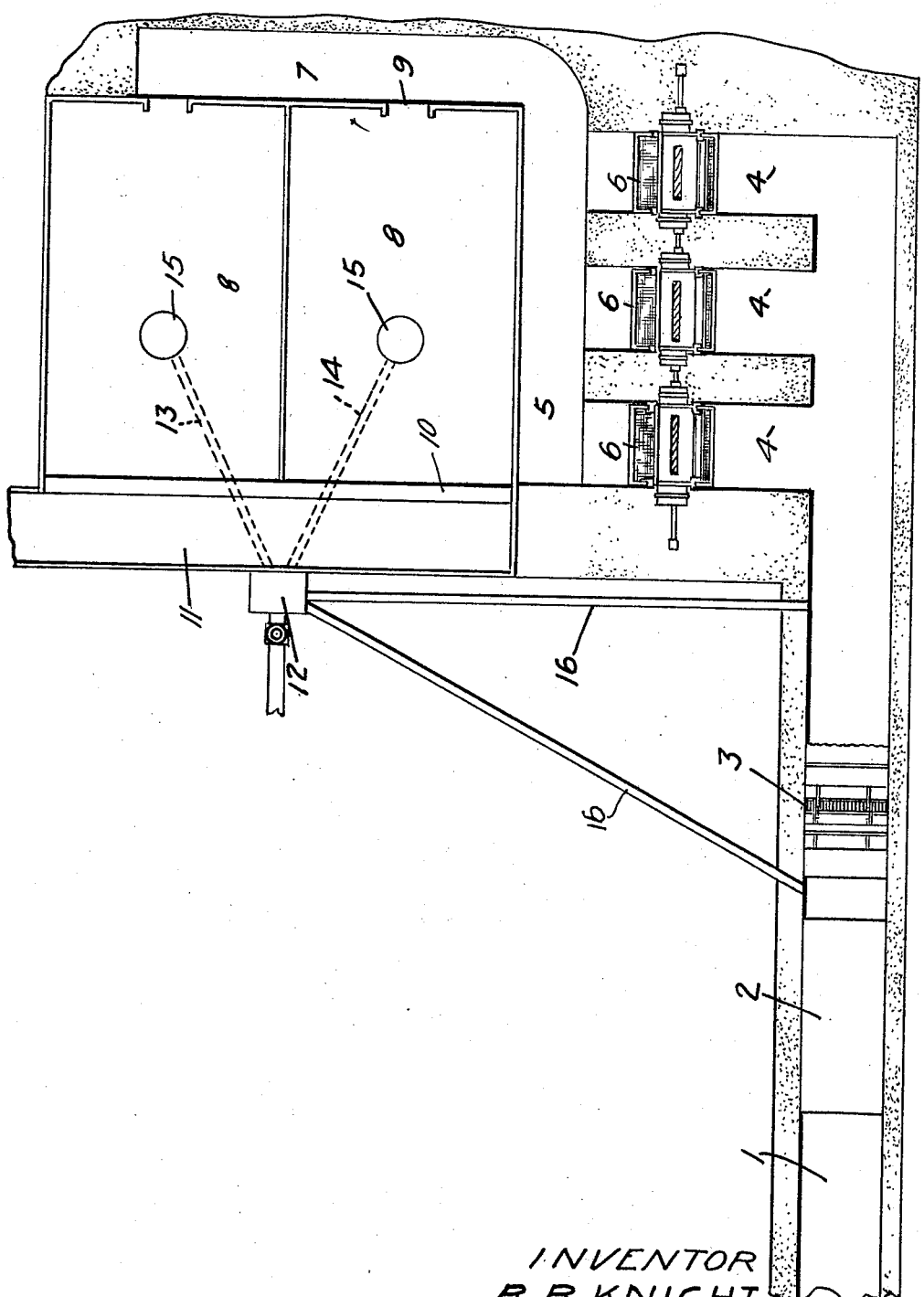
INVENTOR
R. R. KNIGHT.
BY
ATTORNEYS.

Patented Mar. 21, 1933

1,902,248

UNITED STATES PATENT OFFICE

RAYMOND RICE KNIGHT, OF TORONTO, ONTARIO, CANADA

PROCESS AND APPARATUS FOR PURIFICATION OF SEWAGE AND TRADE WASTES

Application filed June 1, 1931. Serial No. 541,330.

My invention relates to improvements in process and apparatus for purification of sewage and trade wastes, and the object of the invention is to devise a process and apparatus by which a greater percentage of suspended matter may be removed from the fluid than has been hitherto possible by removing those particles which are normally too fine to be screened, and it consists essentially of the following steps and arrangement and construction of parts as hereinafter described.

The drawing represents a plan view of my apparatus.

In the drawing like characters of reference indicate corresponding parts in the figure.

1 indicates a channel provided with a detritus chamber 2, a coarse screening apparatus 3 through which the sewage is passed to remove larger portions of foreign matter such as sticks etc., from the sewage flow. 4 are a series of branch channels leading into another main channel 5 paralleling the channel 1. 6 are fine screening apparatus of any desired type but which may be constructed as disclosed in an application filed concurrently herewith, through which the sewage also flows so as to remove the relatively fine solids from the sewage. The sewage liquid then passes through the channel 5 into the side channel 7 extending to one side of sedimentation tanks 8 into which the sewage flows through the ports 9. Aeration or other treatment tanks may, if desired, be interposed between 7 and 8.

10 is a weir extending across the sedimentation tanks over which the liquid is discharged into a discharge channel 11. 12 is a pump or air lift connected by channels 13 and 14 as indicated by dotted lines in the drawing, such channel passing through the substructure forming the bottom of the sedimentation or other tanks 8 and connecting with suitable wells 15 formed in the bottom of each tank. Such sedimentation tanks may or may not be furnished with mechanical scrapers to deliver the solids to the wells 15.

After the sewage is passed through the fine screens 6 and a great percentage of the solids are removed from such sewage it is passed into the sedimentation or other tanks 8. Prior to entering the sedimentation tanks, the liquid may be treated in aeration or other tanks, the very fine solids suspended in the liquid sewage settling to the bottom of the tanks to form a sludge. The surface liquid passes off over the weir 10 and is discharged. The sludge, after forming in the bottom of the tank, is discharged by the pump or air lift 12 into a discharge pipe 16 which carries the sludge into the influent channel 1. The pipe 16 may enter the channel 1 at any point in advance of the fine screens 6 or if desired in advance of the coarse screen 3.

The excess sludge which is not picked up by the screens is discharged through the channel 17 to drying beds, digestors or biological tanks etc.

The fine solids precipitated in the tank 8 become changed in character and enlarged by aeration, coagulation etc., and therefore when they are discharged again into the influent 1 and pass to the screens 6 a large percentage is screened off from the liquid and instead of delivering the solids or sludge to drying beds, digesters, or biological tanks etc., the majority of the solids being, by my process, picked up and delivered by the screens for disposal by burning or other methods.

What I claim as my invention is:

1. A purification process for sewage and trade waste consisting of first passing the sewage flow through screens together with the unscreenable fine solids, then treating the effluent passed through such screens with the unscreenable solids contained therein to form screenable solids, then separating the screenable solids thus formed from the liquid effluent, and finally returning the solids resulting from the aforesaid treatment into the influent in front of the screening point thereof.

2. A purification process for sewage and trade waste consisting of first passing the sewage flow together with the unscreenable fine solids through screens, then passing the screened fluid into a settling tank to separate the sludge therefrom, and then conveying the sludge from the settling tank back into the sewage flow in front of the screening point.

RAYMOND RICE KNIGHT.